J. F. Kellogg,
Tuck Marker.
No. 112,050.  Patented Feb. 21, 1871.
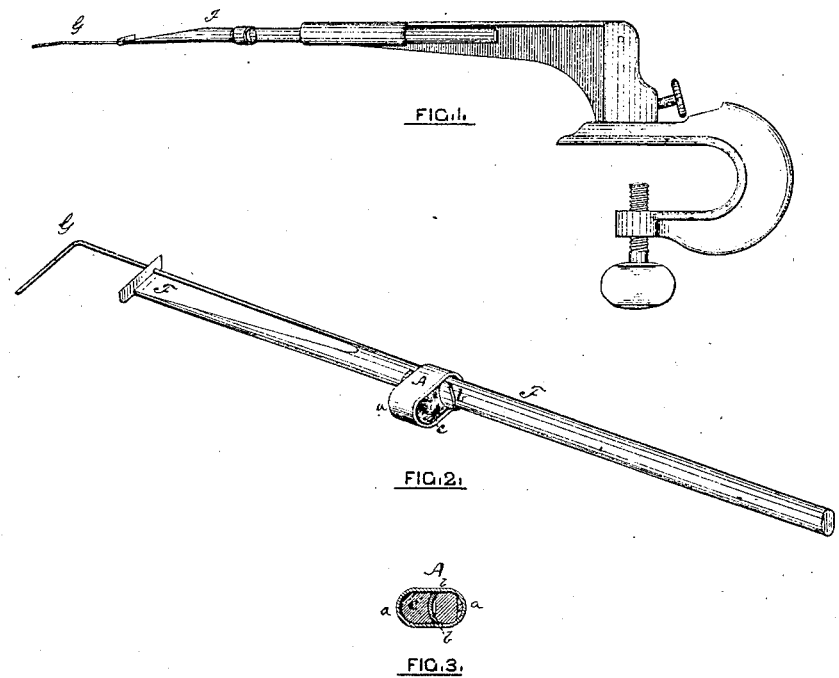
WITNESSES.  
John D. Thurston  
Peter F. Hughes
INVENTOR.  
James Franklin Kellogg  
per B. F. Thurston  
atty

United States Patent Office.

JAMES FRANKLIN KELLOGG, OF NORTH BRIDGEWATER, MASSACHUSETTS.

Letters Patent No. 112,050, dated February 21, 1871.

IMPROVEMENT IN TUCK-MARKERS FOR SEWING-MACHINES.

The Schedule referred to in these Letters Patent and making part of the same.

*To all whom it may concern:*

Be it known that I, JAMES FRANKLIN KELLOGG, of North Bridgewater, in the county of Plymouth and Commonwealth of Massachusetts, have invented a new and useful Improvement in Tuck-Marker for Sewing-Machines; and I do hereby declare that the following specification, taken in connection with the drawing making a part thereof, is a full, clear, and exact description of the same.

The invention hereinafter described is an improvement upon the tuck-creasing attachment for sewing-machines for which Letters Patent were granted to me under date of March 29, 1870.

In the apparatus described in the patent referred to, the plaiting-finger or inside gauge which follows the inside fold of the tuck consists of a wire, with its end slightly flattened, and tapered, and bent at a sharp right angle to the shank. The shank of such gauge is fitted to slide in a longitudinal socket in the arm with which it is connected, and is secured in any position to which it may be adjusted by means of a set-screw, reference being had to said patent and the accompanying drawing for a full description of the apparatus therein described.

The present invention relates only to a device in combination with such gauge and its supporting-arm in place of the set-screw, for enabling the gauge to be more conveniently and readily adjusted to tucks of different widths.

In the drawing—

Figure 1 is a view, in perspective, of the improved tuck-marker, with the exception of its adjuncts, which, when the apparatus is in use, are connected with the presser-foot of the sewing-machine.

Figure 2 is an enlarged view, in perspective, of so much of the apparatus as will show plainly the improvement.

Figure 3 is a sectional view of the clamp hereinafter described.

The adjustable inside gauge G, whose arrangement with reference to the arm F is shown at fig. 3, is connected at its rear end, in any convenient way, to the friction-clamp A, fig. 3, which is the means employed in place of a set-screw for more readily adjusting the gauge in position.

This clamp consists of a strap, $a$, shown in section at fig. 3, a pad, $b$, fitted to the contour of the arm F, and a yielding spring, $c$, of rubber or other elastic material, arranged to exert pressure upon the pad, and by the friction upon the arm F, so created, hold the gauge at any point desired.

While I consider the form of the pressure-clamp shown in the drawing to be the best and most convenient, other known mechanical arrangements for causing friction to be applied to the arm F may be employed as a substitute therefor without substantially changing the combination of mechanical devices hereinafter claimed.

It is quite evident that this mode of adjustment presents obvious advantages over a set-screw, and enables the operator to change the adjustment of the gauge with the greatest facility.

I claim—

The combination of a pressure-clamp, A, with the adjustable gauge G and arm F of a tuck-marker, substantially as described, for the purposes specified.

JAMES FRANKLIN KELLOGG.

Witnesses:
A. J. CUSHING,
PETER F. HUGHES.